(12) United States Patent
Li

(10) Patent No.: US 11,692,712 B2
(45) Date of Patent: Jul. 4, 2023

(54) CONTROL MECHANISM AND METHOD OF A HYBRID HEATING SYSTEM

(71) Applicant: Dansons US, LLC, Phoenix, AZ (US)

(72) Inventor: Li Li, Chandler, AZ (US)

(73) Assignee: Dansons US, LLC, Scottsdale, AZ (US)

( * ) Notice: Subject to any disclaimer, the term of this patent is extended or adjusted under 35 U.S.C. 154(b) by 336 days.

(21) Appl. No.: 15/930,110

(22) Filed: May 12, 2020

(65) Prior Publication Data
US 2021/0356130 A1 Nov. 18, 2021

(51) Int. Cl.
F24B 1/02 (2006.01)
A47J 37/07 (2006.01)
F23B 50/12 (2006.01)

(52) U.S. Cl.
CPC .......... *F24B 1/024* (2013.01); *A47J 37/0704* (2013.01); *F23B 50/12* (2013.01); *F23B 2700/013* (2013.01); *F23B 2900/00001* (2013.01); *F23G 2207/101* (2013.01); *F23N 2239/02* (2020.01)

(58) Field of Classification Search
None
See application file for complete search history.

(56) References Cited

U.S. PATENT DOCUMENTS

| 10,201,247 B1* | 2/2019 | Jones ................. A47J 37/0704 |
| 10,342,384 B2 | 7/2019 | Allmendinger |
| 2017/0164783 A1 | 6/2017 | Sauerwein et al. |
| 2018/0368617 A1 | 12/2018 | Allmendinger |
| 2019/0290064 A1* | 9/2019 | Colston ............... A47J 37/0704 |

FOREIGN PATENT DOCUMENTS

| DE | 102019107552 | 9/2019 |
| DE | 102019107595 | 9/2019 |

OTHER PUBLICATIONS

European Search Report for Application No. 21171091.8, dated Sep. 24, 2021, 8 pages.

* cited by examiner

*Primary Examiner* — Jason Lau
(74) *Attorney, Agent, or Firm* — Seyfarth Shaw LLP

(57) ABSTRACT

Disclosed is an outdoor cooking appliance with a control mechanism for controlling a heating system to provide heat to a cooking chamber of the appliance within a more precise range in temperature. For example, fuel provided to a burn pot for combustion to reach a range of a target temperature of the cooking chamber. A heating element provides additional heat to bring the temperature of the cooking chamber closer to the target temperature.

17 Claims, 5 Drawing Sheets

CONTROL MECHANISM AND METHOD OF A HYBRID HEATING SYSTEM

TECHNICAL FIELD OF THE INVENTION

The presently disclosed embodiments relate generally to grills and smokers. More particularly, the presently disclosed embodiments relate to a control mechanism of a heating system that provides heat to a cooking chamber of a grill or smoker.

BACKGROUND OF THE INVENTION

Pellet grills and smokers are common types of appliances used for cooking meat or other food. These appliances burn fuel, such as pellets of wood, charcoal, etc., in a burn pot. The burn pot is typically located at a bottom area of the appliance and directs heat and smoke upward into a cooking chamber. Fuel is supplied to the burn pot from a hopper via an auger based on a temperature of the cooking chamber. A user can operate a user interface to set the temperature of the cook chamber and the appliance will then burn fuel in the burn pot using an ignitor (also referred to as a hot rod) until the temperature is reached.

A controller, such as a proportional-integral-derivative (PID) controller, will control the auger to supply a determined amount of fuel to reach the desired temperature. Delays in providing heat from combustion causes the temperature in the cooking chamber to fluctuate from the desired temperature range.

SUMMARY OF THE INVENTION

The presently disclosed embodiments include an appliance with a heating system that heats air supplied by a fan to combust fuel, such as pellets, charcoal, etc., in a burn pot and to provide heat to a cooking chamber. The air is heated by a heating element and directed to the burn pot, which causes combustion of fuel disposed in the burn pot, and to the cooking chamber. The heating system has less of a delay than the ignitor used in typical pellet grills and smokers because the heated air can be directed to the cooking chamber without waiting for fuel to combust. Thus, less temperature fluctuation occurs in the cooking chamber. Further, the heating system can include one or more controllers that control the auger to supply a determined fuel, and that further control the heating element to provide the auxiliary heat. Because the heating element has a quick reaction time, the heating element can provide whatever heat is needed to reach the desired temperature of the cooking chamber, and smooth any temperature spikes that would otherwise occur. The desired temperature can therefore be controlled in a more precise range with less fluctuation.

In particular, the presently disclosed embodiments include an appliance that includes a hopper that contains fuel, a burn pot, an auger that conveys fuel from the hopper to the burn pot, and a heating element that heats air for combustion of fuel conveyed to the burn pot and for providing heat to a cooking chamber. The auger and heating element are controlled by one or more controllers.

The presently disclosed embodiments further include a method for controlling a heating system for a pellet grill or smoker. The method includes feeding fuel via an auger to a burn pot for combustion, activating a heating element to combust the fuel, setting a constant fuel feed ratio to the burn pot when a temperature of a cooking chamber of the pellet grill or smoker is within a first range of a target temperature, and activating the heating element to provide heat to the cooking chamber to bring the temperature within a second range of a target temperature.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
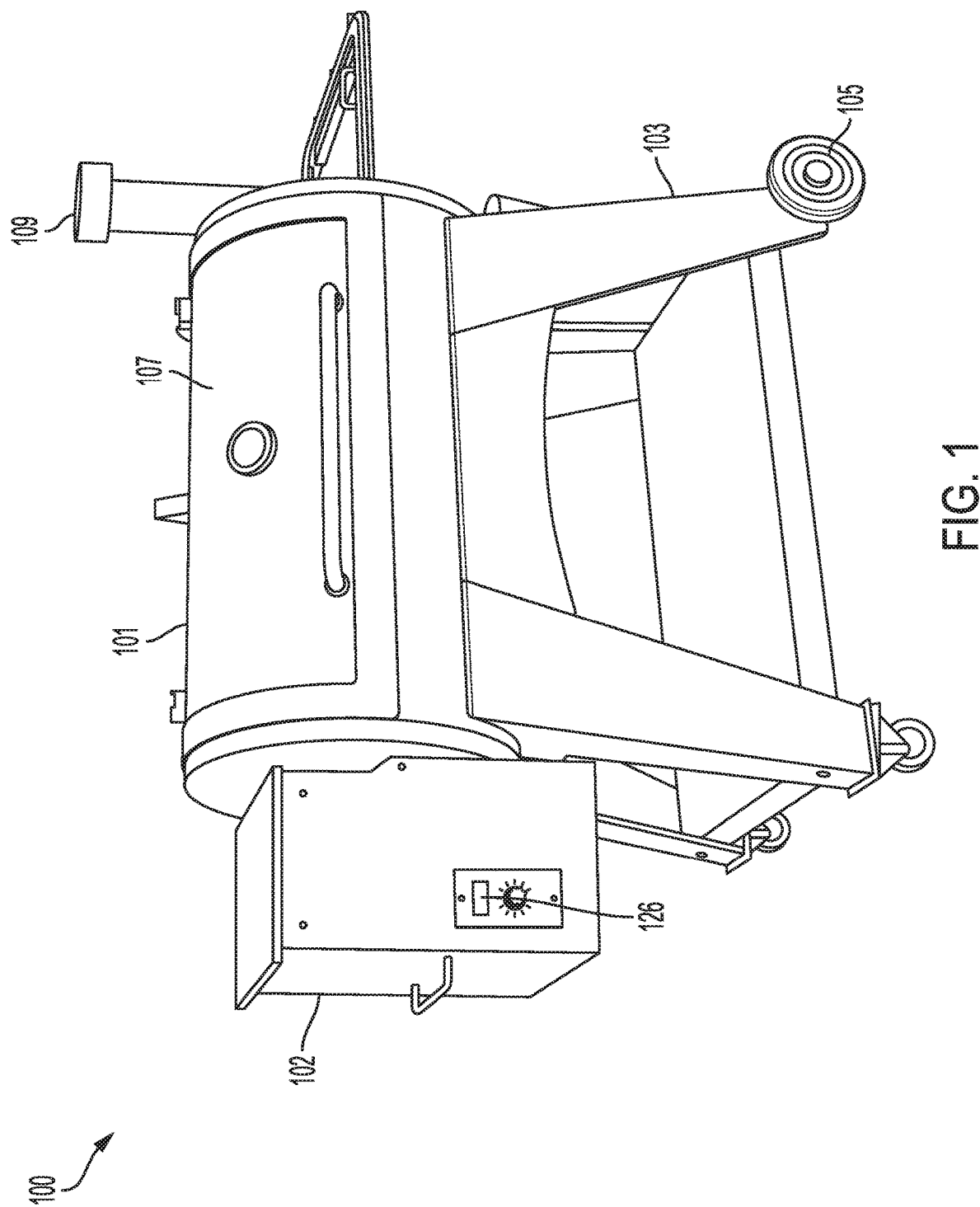
FIG. 1 is a front perspective view of an appliance according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include an outdoor cooking appliance such as a smoker or grill with a heating element that heats air from a fan to combust fuel, such as wood pellets, charcoal, or other matter, conveyed by an auger to a burn pot. The combustion of fuel creates heat and smoke that is directed into a cooking chamber of the appliance. The heated air is also directed to the cooking chamber to provide heat to the cooking chamber. One or more controllers, such as a PID controller, can be used to control the auger and the heating element. The target temperature set by the user can be reached by the combined heat provided by the combusting pellets and air passing around the heating element. Accordingly, heat is provided to the cooking chamber without requiring a delay for combustion of fuel, thus a more precise temperature range can be maintained in the cooking chamber.

As shown in FIG. 1, an appliance 100 includes a cooking chamber 101 coupled to a base 103 having wheels 105. Within the cooking chamber 101 food, for example, meat or vegetables, can be cooked in either a grilling or smoking application. The cooking chamber 101 can be enclosed by a lid 107 on a top of the cooking chamber 101 that allows the user access to retrieve or adjust the food being cooked within the cooking chamber 101. In certain exemplary embodiments, the appliance 100 is a pellet grill or smoker, although the present invention is not so limited. The appliance 100 can further include a chimney 109 for directing exiting smoke and heat in an upwardly direction so as to provide the outlet for air flow through the appliance 100.

Figure 2:
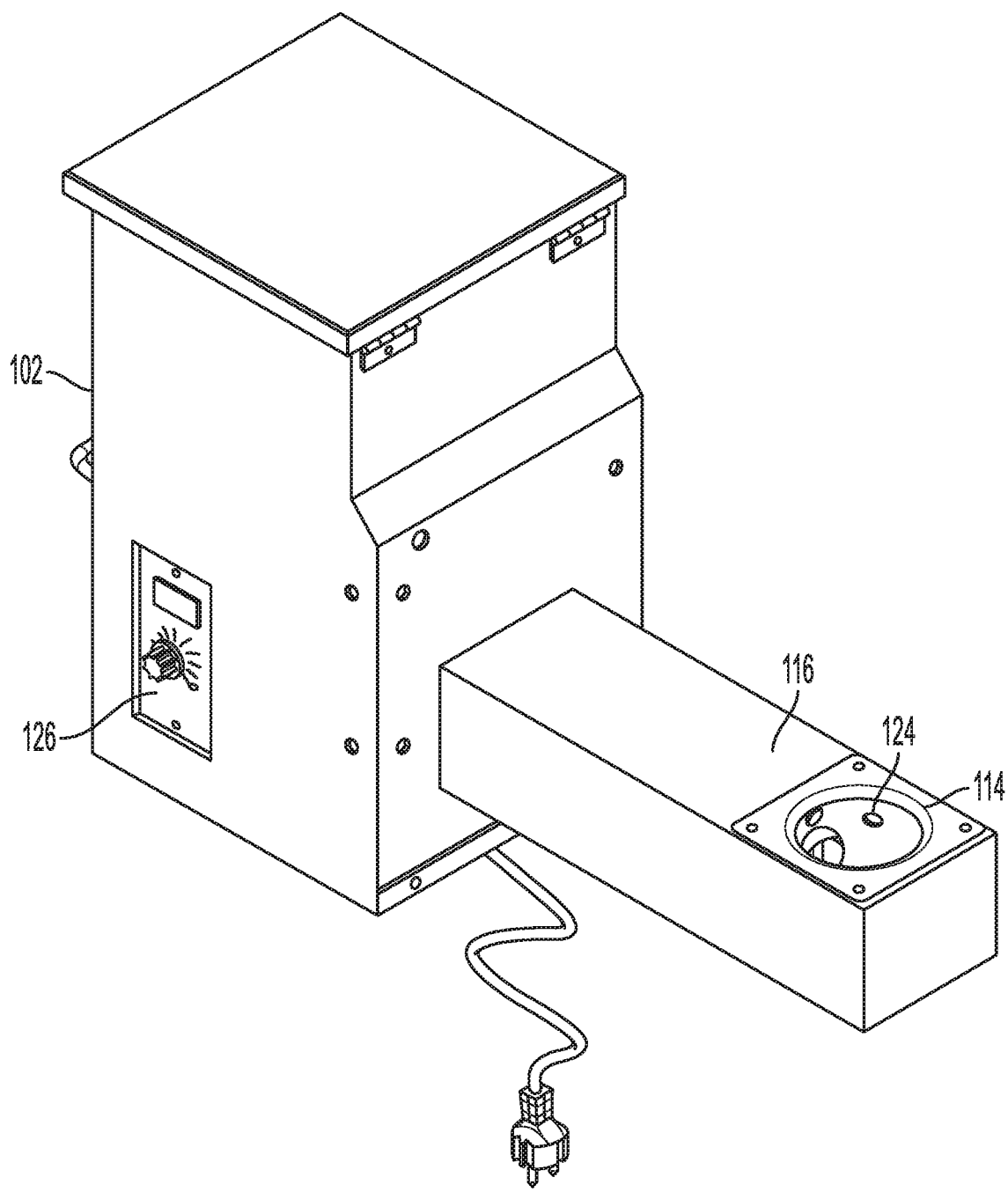
FIG. 2 is a top perspective view of a heating system of an appliance according to at least one of the presently disclosed embodiments.
Figure 3:
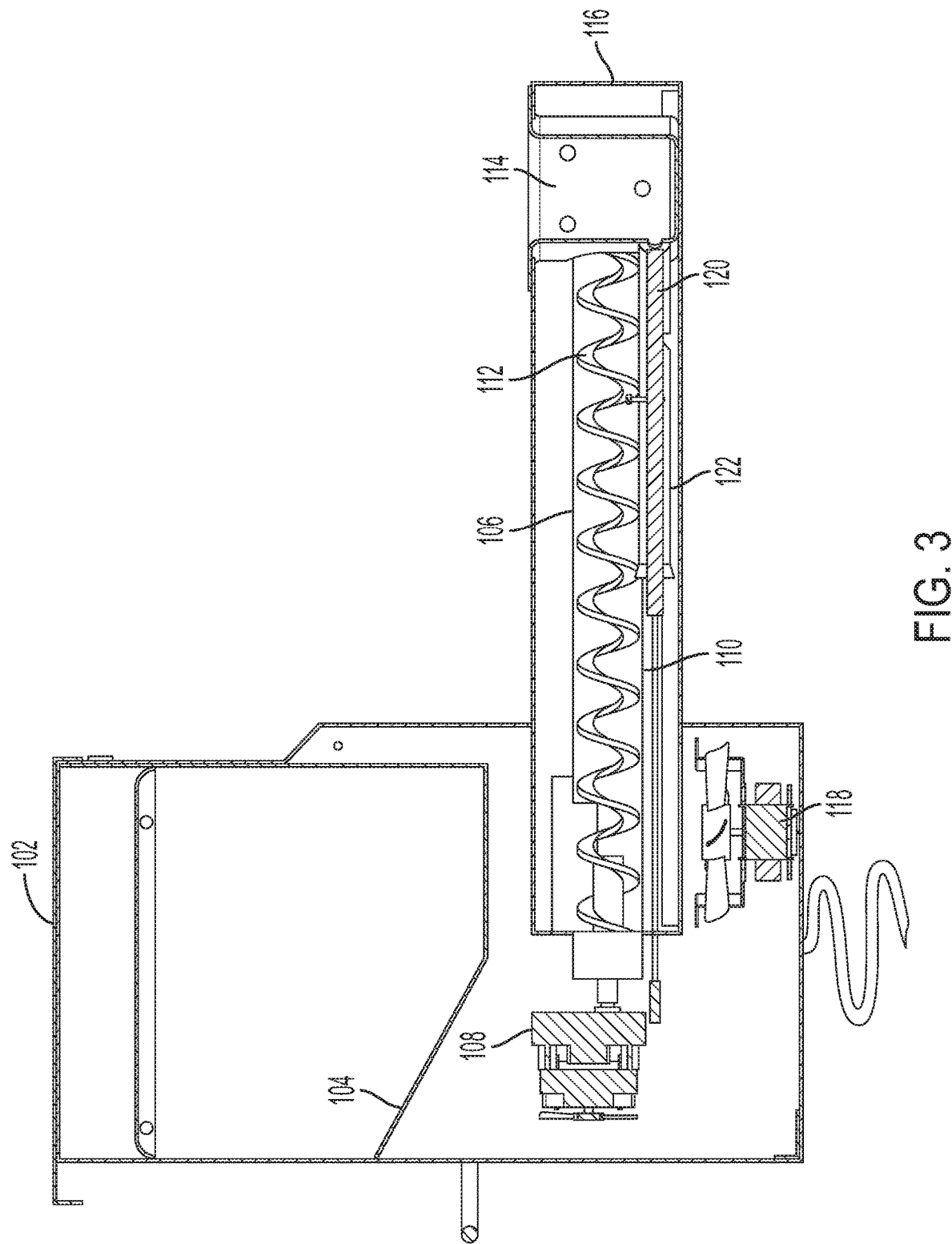
FIG. 3 is a partial broken front view of the heating system disposed in an appliance according to at least one of the presently disclosed embodiments.

FIGS. 2 and 3 illustrate a heating system according to at least some of the presently disclosed embodiments. As shown, the heating system can be used with a pellet grill or smoker, although the present invention is not so limited. As shown in FIGS. 2 and 3, the heating system includes a hopper 102 including a funnel 104. The hopper 102 can hold and contain fuel (such as wood pellets, charcoal, or other combustible matter), and the funnel 104 can direct the fuel to an auger 106. The auger 106 can include a motor 108 housed within an auger housing 110 and that powers fighting 112 disposed within the auger housing 110. The auger 106 can convey fuel to a burn pot 114 for combustion. Smoke and heat resulting from the combustion within the burn pot 114 is directed to the cooking chamber 101 where food, for example, meat or vegetables, can be cooked in either a grilling or smoking application. The auger 106 can be surrounded by an auger body 116 as an enclosure. The auger 106, burn pot 114, and/or the heating system, can be at least partially enclosed within the appliance 100.

Figure 4:
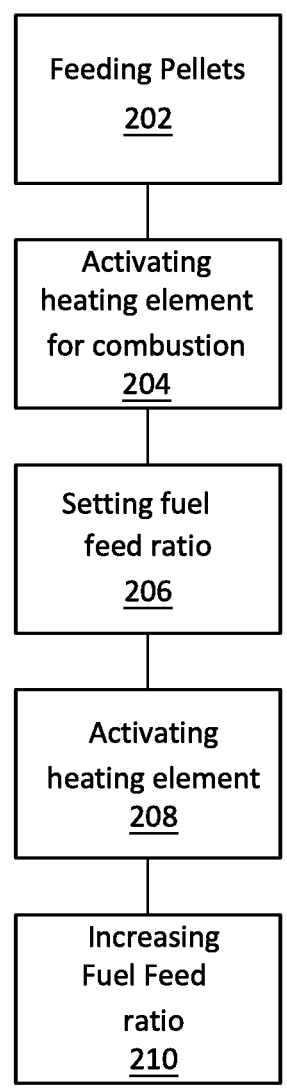
FIG. 4 is a flow diagram illustrating a method of controlling a temperature of a cooking chamber of the appliance according to at least one of the presently disclosed embodiments.

FIG. 3 is a partial broken front view of the heating system according to at least one of the presently disclosed embodiments; and FIG. 4 is a front perspective view of a heating system according to at least one of the presently disclosed embodiments. The heating system can further include a fan 118 for providing air to the auger body 116, a heating element 120 for heating fuel, and a heating element housing 122 that encloses the heating element 120. For example, the heating element housing 122 can be a tubular component that partially encloses the heating element 120, for example, around a circumference of the heating element 120. The heating element housing 122 can be coupled to the burn pot 114 to allow heated air to flow into the burn pot 114.

The fan 118 can direct air into the body 116 and improve air flow characteristics of the appliance 100 as a whole. The air is then directed into the heating element housing 122 for heating by the heating element 120, and then into the burn pot 114 via apertures 124 to assist in combustion of fuel. The air can further be directed around an outside surface of the auger housing 110 to assist in cooling the auger 106 to prevent unwanted combustion of fuel disposed therein.

The heating element 120 can be an electrically powered heating element. The heating element 120 can heat the air in a space between an inner surface of the heating element housing 122 and an outer surface of the heating element 120. The heating element 120 can heat the air to about 800-1200° F. The heated air is then directed to the burn pot 114 to cause combustion of fuel disposed therein. In addition, the heated air is directed into the cooking chamber 101 to provide heat thereto without needing to wait for the combustion of fuel. Accordingly, the heat generated by combustion of fuel is a first heating resource, and heat provided by the heated air is a second heating resource to provide heat to the cooking chamber 101. The two heating resources can be used together to provide a consistent supply of heat to the cooking chamber 101 by maintaining an amount of heat near the maximum heat provided by the burning pellets. When the pellets are burning at their maximum temperature, little to no additional heat is required to be provided by the heated air flowing across the heating element 120. When no pellets are provided, however, the appliance 100 can cause the heating element 120 and fan 118 to supply the amount necessary to meet or approach the maximum heat provided by the combusted pellets. In this manner, temperature spikes can be reduced and a consistent supply of heat can be provided to the cooking chamber 101.

As shown, the apertures 124 in the burn pot 114 can be substantially circular to allow air from the fan 118 to pass therethrough. However, the apertures 124 can be any size opening or hole, including circular, oval, rectangular, or multiple slotted openings.

The auger 106 is controlled by one or more controllers to supply a determined amount of fuel to the burn pot 114, and the heating element 120 can be controlled by the same controller as the auger 106 or a second controller. The controller(s) can be proportional-integral-derivative (PID) controller(s). The controller(s) can therefore control the auger 106 and the heating element 120 based on inputs from temperature sensors disposed in the cooking chamber 101 and a user interface 126. The temperature sensors are operatively coupled to the controller(s) and can indicate a temperature in the cooking chamber 101 and/or of the meat or vegetables being cooked in the cooking chamber 101. Because the heating element 120 has a quick reaction time compared to combustion of fuel, a temperature of the cooking chamber 101 can be controlled in a more precise range of the target temperature set by the user at the user interface 126.

As shown, the user interface 126 can be disposed on the appliance 100, but the user interface 126 can also be on an application loaded on user's personal electronic device, such as a phone, tablet, or computer. The user interface 126 is operatively coupled to the controller(s). The user interface 126 can receive inputs from the user indicating a target temperature of the cooking chamber 101. Other settings of the appliance may be set by the user using the user interface 126. In an embodiment, the user interface 126 is operatively coupled to temperature sensors and can include a display to indicate the target temperature, current temperature, etc. sensed by the temperature sensors. In another embodiment, the user interface 126 is a touch screen.

The target temperature is reached based on the cumulative heat provided by the combustion of pellets and the provision of hot air by the heating element 120. In an embodiment, the one or more controllers control the provision of pellets through the auger 106 and into the burn pot 114 to provide first heat to the cooking chamber 101. The controller(s) further control the fan 118 and heating element 120 to collectively provide second heat to the cooking chamber. Together, the first and second heat are intended to cause the cooking chamber 101 to be maintained at the target temperature. For example, the controller(s) can control the heat provided by air heated by the heating element 120 to be minimal when fuel is combusting in the burn pot 114 at its peak temperature. When the temperature within the cooking chamber 101 decreases due to the pellets no longer combusting at their peak temperature, the controller(s) controls the heat provided by air heated by the heating element 120 to be higher than when the pellets were at their peak temperature. Thus, temperature spikes in the cooking chamber 101 caused by combustion are minimized.

An embodiment of a method 200 of controlling a temperature of the cooking chamber 101 of the appliance 100 is shown in FIG. 4. With references to FIGS. 1-4, in an embodiment, the method, at step 202, includes feeding an amount of fuel to the burn pot 114 for combustion; and at step 204, includes activating the heating element 120 for a period of time to combust fuel. The heating element 120, which is controlled by the second controller, functions as an ignitor to cause fuel to combust. Method steps 202 and 204 can also be referred to as a startup mode. At this point the user has already set a target temperature and the intent of the method 200 is to reach that target temperature based on the cumulative heat provided by both the combusting pellets and heating element 120. During this first phase, the appliance 100 can preheat by feeding fuel such as pellets by the auger 106, the provision of which is controlled by the controller(s) causing the auger 106 to supply fuel until a first temperature is reached.

When the at least one controller determines the temperature has "plateaued" or reached its peak from combustion of pellets, the controller(s) can cause the heat provided by the heating element 120 and fan 118 to increase to reach the target temperature. For example, the combustion of pellets can reach 90% of the desired heat at their maximum combustion temperature, and the heat provided by the heating element 120 and fan 118 can augment the heat provided by the pellets to account for the remaining 10%.

When the heat provided by the combustion of pellets decreases and the temperature in the cooking chamber 101 correspondingly decreases, the controller(s) can cause the fan 118 to increase its blowing power and/or the heating element 120 to increase its heat, to account for the remaining necessary heat. For example, if the combustion of pellets decreases below its peak temperature such that the heat provided by the pellets is only 70%, the controller(s) can cause the fan 118 and heating element 120 to increase their heat provision to account for the remaining 30%. This process reduces temperature spikes.

The method, at step 206, includes setting a constant fuel feed ratio to the burn pot 114 when the temperature of the cooking chamber 101 is within a first range of the target temperature. For example, when the temperature of the cooking chamber 101 is 5° F. below the target temperature, the controller(s) determine and set the fuel feed ratio to maintain the temperature of the cooking chamber 101. In other words, the controller(s) control the auger 106 to operate at a constant speed to supply fuel for combustion at the determined ratio to keep the temperature of the cooking chamber 101 within the first range of the target temperature.

The method, at step 208, includes activating the heating element 120 for a period of time when the temperature of the cooking chamber 101 is within the first range of the target temperature to bring the temperature of the cooking chamber 101 to a second range of the target temperature. For example, if the temperature of the cooking chamber 101 is within 5° F. of the target temperature, the controller(s) calculates an amount of time the heating element 120 needs to be activated to provide heated air to the cooking chamber 101 in order to reach the second range of the target temperature. The controller(s) then activates the heating element 120 for the calculated amount of time. The second range can be more precise than the first range. For example, the second range can be within 1° F. of the target temperature.

The method, at step 210, includes increasing the fuel feed ratio when the temperature of the cooking chamber 101 is no longer within the first range of the target temperature. When the temperature of the cooking chamber 101 is once again within the first range, steps 206 and 208 are repeated to bring the temperature within the second range.

Figure 5:
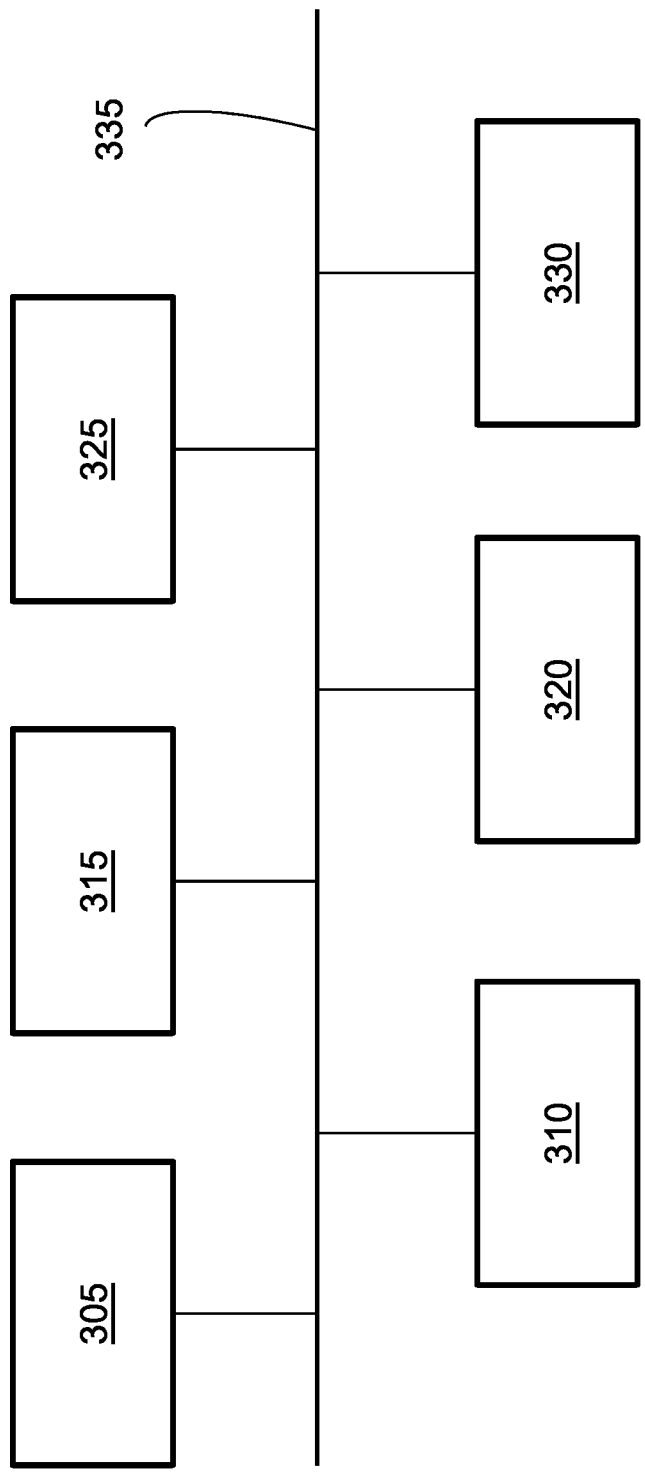
FIG. 5 is a schematic view of a controller according to an embodiment of the present invention.

Referring to FIG. 5, an embodiment of the present invention includes at least one controller that controls the heating system. The controller(s) can include an interface 305, processor 310, transceiver 315, display 320, temperature sensor 325, and a memory 330 connected via a bus 335. The interface 305 allows the user to input information or commands into the controller(s) and to transmit the information or command to the heating system. For example, the user can input information relating to a target temperature of the cooking chamber 101. By way of example, the interface can include a keyboard, mouse, touch screen, audio recorder, audio transmitter, member pad, voice-to-text or any other device that allows for the entry of information from a user.

The processor 310 facilitates communication between the various components of the controller(s). The processor 310 can be any type of processor or processors that alone or in combination can facilitate communication within the controller and, together with the transceiver 315, transmit information from the controller to the heating system. For example, the processor 310 can be a desktop or mobile processor, a microprocessor, a single-core or a multi-core processor.

In an embodiment, the transceiver 315 is provided. The transceiver 315 can be any device that can transmit data from the controller or can receive data within the controller 126 from an external data source. By way of example, the transceiver 315 can be any type of radio transmission antenna, cellular antenna, hardwired transceiver, Bluetooth®, Wi-Fi, or any other type of wired or wireless transceiver that is capable of communicating with an external device.

The display 320 can display various information for the user to view and interpret, including information received from the temperature sensor 325. By way of example, the display 320 can include a liquid crystal display (LCD), organic light emitting diode (OLED) display, plasma screen, cathode ray tube display, or any other kind of black and white or color display that will allow the user to view and interpret information.

The temperature sensor 325 is provided and can allow the controller to determine the temperature inside the cooking chamber 101 and thus determine if additional heat is required. The temperature sensor 325 can be a thermocouple, an RTD (resistance temperature detector), a thermistor, a semiconductor based integrated circuit (IC), or any other device or system that can determine the temperature of a cooking chamber 101.

The memory 330 can include any non-transitory computer-readable recording medium, such as a hard drive, DVD, CD, flash drive, volatile or non-volatile memory, RAM, or any other type of data storage.

Accordingly, the present invention provides a heating system that allows the temperature inside the cooking chamber to be adjusted and controlled with less fluctuation compared to typical pellet grills and smokers that use ignitors and a single controller. Further, the present invention provides a method of controlling a heating system to more precisely maintain the temperature of the cooking chamber.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An appliance comprising:
a cooking chamber where food is cooked;
a temperature sensor located proximate the cooking chamber;
an interface where a user can input a target temperature indicating a desired temperature for the cooking chamber;
a burn pot;
a heating element located proximate or within the burn pot; and
a fan located proximate the heating element and that blows air across the heating element into the burn pot;
an auger that conveys fuel to the burn pot;
wherein the auger and heating element are controlled by at least one controller, and
wherein the controller controls the auger to distribute fuel to be combusted in the burn pot until a temperature within a first range of the target temperature is sensed by the temperature sensor, and in response to the temperature sensor sensing the temperature within the first range of the target temperature, the controller controls the auger to cease the provision of pellets and controls the heating element and fan to augment the heat from the combustion of fuel until a temperature within a second range of the target temperature is reached.

2. The appliance of claim 1, wherein the heating element is electrical.

3. The appliance of claim 1, wherein air is heated by the heating element to about 800-1200° F.

4. The appliance of claim 1, wherein the burn pot is a pellet combustion burn pot for a pellet smoker or grill.

5. The appliance of claim 1, wherein the controller determines an amount of fuel needed to be conveyed to the burn pot for combustion for a temperature of the cooking chamber to reach the first range of the target temperature of the cooking chamber.

6. The appliance of claim 5, wherein the controller controls the auger to operate at a constant speed when the temperature is within the first range.

7. The appliance of claim 1, wherein the at least one controller is a proportional-integral-derivative controller.

8. The appliance of claim 1, wherein the second range is more precise than the first range.

9. A method for controlling a heating system for a pellet grill or smoker comprising:
receiving user input of a target temperature at which the pellet grill or smoker will be heated;
feeding fuel via an auger to a burn pot of the pellet grill or smoker for combustion;
activating a heating element and fan to combust the fuel;
sensing a temperature of the pellet grill or smoker when the temperature is within a first range of a target temperature;
ceasing the provision of pellets via the auger upon the sensing of the temperature reaching the temperature within the first range of the target temperature;
activating the fan and the heating element to augment the heat provided by the combustion of pellets in response to the temperature reaching the temperature within first range of the target temperature; and
maintaining activation of the fan and heating element until the temperature reaches a temperature within a second range of the target temperature.

10. The method of claim 9 further comprising increasing the fuel feed ratio when the temperature is not within the first range.

11. The method of claim 9, wherein the auger and heating element are controlled by at least one controller.

12. The method of claim 11, wherein the at least one controller is a proportional-integral-derivative controller.

13. The method of claim 9, further comprising determining, by the at least one controller, an amount of fuel needed to combust in order to bring the temperature within the first range and the fuel feed ratio needed to maintain the temperature.

14. The method of claim 9, further comprising determining, by the at least one controller, a period of time the heating element needs to be activated to bring the temperature within the second range.

15. The method of claim 9, wherein the second range is more precise than the first range.

16. The method of claim 9, wherein the target temperature is input using a user interface.

17. The method of claim 9, wherein the sensing is indicated by a sensor operably coupled to at least one controller.

* * * * *